(12) United States Patent
Jeong et al.

(10) Patent No.: US 10,547,208 B2
(45) Date of Patent: Jan. 28, 2020

(54) WIRELESS POWER TRANSMIT RESONATOR

(71) Applicant: QUALCOMM INCORPORATED, San Diego, CA (US)

(72) Inventors: Seong Heon Jeong, San Diego, CA (US); Francesco Carobolante, San Diego, CA (US); William Henry Von Novak, III, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 613 days.

(21) Appl. No.: 15/190,283

(22) Filed: Jun. 23, 2016

(65) Prior Publication Data
US 2017/0373538 A1 Dec. 28, 2017

(51) Int. Cl.
*H02J 50/12* (2016.01)
*H02J 50/23* (2016.01)
*H02J 50/80* (2016.01)

(52) U.S. Cl.
CPC .............. *H02J 50/12* (2016.02); *H02J 50/23* (2016.02); *H02J 50/80* (2016.02)

(58) Field of Classification Search
CPC ....................................................... H02J 50/12
See application file for complete search history.

(56) References Cited

U.S. PATENT DOCUMENTS

| | | | |
|---|---|---|---|
| 7,288,918 B2 | 10/2007 | Di Stefano et al. | |
| 8,466,654 B2 | 6/2013 | Cook et al. | |
| 8,655,272 B2 | 2/2014 | Saunamaki et al. | |
| 2004/0000974 A1 | 1/2004 | Odenaal et al. | |
| 2008/0224792 A1* | 9/2008 | Nielsen | H03H 21/0001 333/17.1 |
| 2009/0261897 A1* | 10/2009 | Bobde | H01L 23/60 327/552 |
| 2011/0248900 A1* | 10/2011 | de Rochemont | H01Q 9/26 343/803 |
| 2013/0077360 A1 | 3/2013 | Low et al. | |
| 2014/0015329 A1 | 1/2014 | Widmer et al. | |
| 2016/0056639 A1 | 2/2016 | Mao | |
| 2017/0126202 A1* | 5/2017 | Shapoury | H01P 1/203 |

FOREIGN PATENT DOCUMENTS

EP 2939309 A2 11/2015

OTHER PUBLICATIONS

International Search Report and Written Opinion—PCT/US2017/035871—ISA/EPO—dated Sep. 18, 2017.

\* cited by examiner

*Primary Examiner* — Jared Fureman
*Assistant Examiner* — James P Evans
(74) *Attorney, Agent, or Firm* — Smith Temple Blaha LLC/Qualcomm

(57) ABSTRACT

Exemplary embodiments of the present disclosure are related to a wireless power resonator and method that includes a wireless power transmit element. The wireless power transmit element may include a substantially planar transmit antenna configured to generate a magnetic field and formed from a conductive trace including a plurality of distributed inductive elements along the conductive trace. The transmit element may further include a filter formed from selected ones of the plurality of distributed inductive elements of the planar transmit antenna and configured to generate at least one frequency response.

17 Claims, 13 Drawing Sheets

US 10,547,208 B2

WIRELESS POWER TRANSMIT RESONATOR

TECHNICAL FIELD

The present disclosure relates generally to wireless power transfer, and in particular, improving, at a wireless power transmitter, radio frequency (RF) desense in wireless power receivers.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power. As such, these devices constantly require recharging. Rechargeable devices are often charged via wired connections that require cables or other similar connectors that are physically connected to a power supply. Cables and similar connectors may sometimes be inconvenient or cumbersome and have other drawbacks. Wireless power charging systems, for example, may allow users to charge and/or power electronic devices without physical, electrical connections, thus reducing the number of components required for operation of the electronic devices and simplifying the use of the electronic device.

While wireless power charging may be convenient, the necessary high power signal levels may create interference in receivers of devices that are being charged. It would be desirable to improve receiver signal levels by reducing transmitter interference.

SUMMARY

The systems, methods, and devices of the present disclosure each have several aspects, no single one of which is solely responsible for its desirable attributes. The implementations disclosed herein each have several innovative aspects, no single one of which is solely responsible for the desirable attributes of the present disclosure. Without limiting the scope of this present disclosure as expressed by the claims which follow, some features will now be discussed briefly. After considering this discussion, and particularly after reading the section entitled "Detailed Description," one will understand how the features of the various implementations of this invention provide advantages that include improved wireless charging between wireless power transmitting units and wireless power receiving units.

In one aspect, a wireless power transmit element includes a substantially planar transmit antenna configured to generate a magnetic field and formed from a conductive trace including a plurality of distributed inductive elements along the conductive trace and a first filter formed from first selected ones of the plurality of distributed inductive elements of the planar transmit antenna and configured to generate a first frequency response.

In another aspect, a method for transmitting wireless power is disclosed. The method includes generating a magnetic field from a signal provided to a substantially planar transmit antenna formed from a conductive trace including a plurality of distributed inductive elements along the conductive trace and filtering a first frequency of the signal with a first filter including first selected ones of the plurality of distributed inductive elements of the planar transmit antenna.

In yet another aspect, a wireless power transmit device is disclosed. The wireless power transmit device includes means for generating a magnetic field from a signal provided to a substantially planar transmit antenna formed from a conductive trace including a plurality of distributed inductive elements along the conductive trace and means for filtering a first frequency of the signal with a first selected ones of the plurality of distributed inductive elements of the planar transmit antenna.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings.

DETAILED DESCRIPTION

Figure 1:
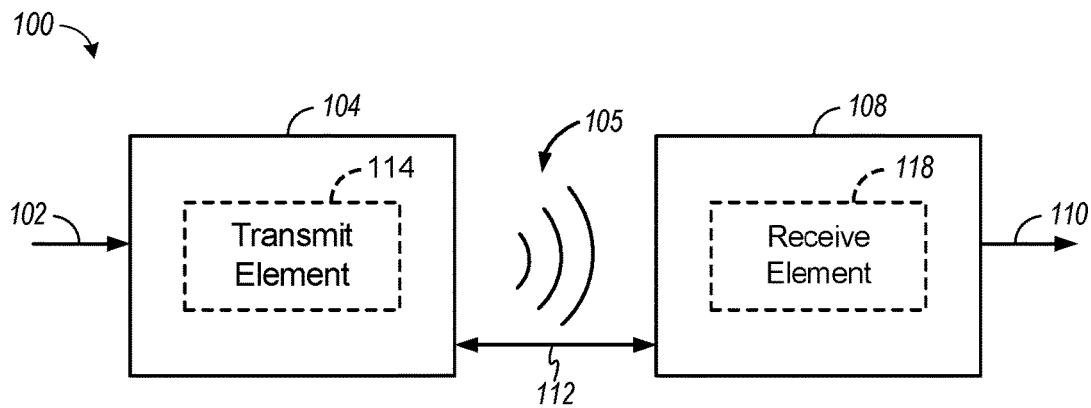
FIG. 1 is a functional block diagram of a wireless power transfer system in accordance with an illustrative embodiment.

Drawing elements that are common among the following figures may be identified using the same reference numerals.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

FIG. 1 is a functional block diagram of a wireless power transfer system 100, in accordance with an illustrative embodiment. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element 114 for transmitting/coupling energy to the receiver 108. The receiver 108 may include a power receiving element 118 for receiving or capturing/coupling energy transmitted from the transmitter 104.

In one illustrative embodiment, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain embodiments, the wireless field 105 may correspond to the "near field" of the transmitter 104. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114.

In certain embodiments, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Figure 2:
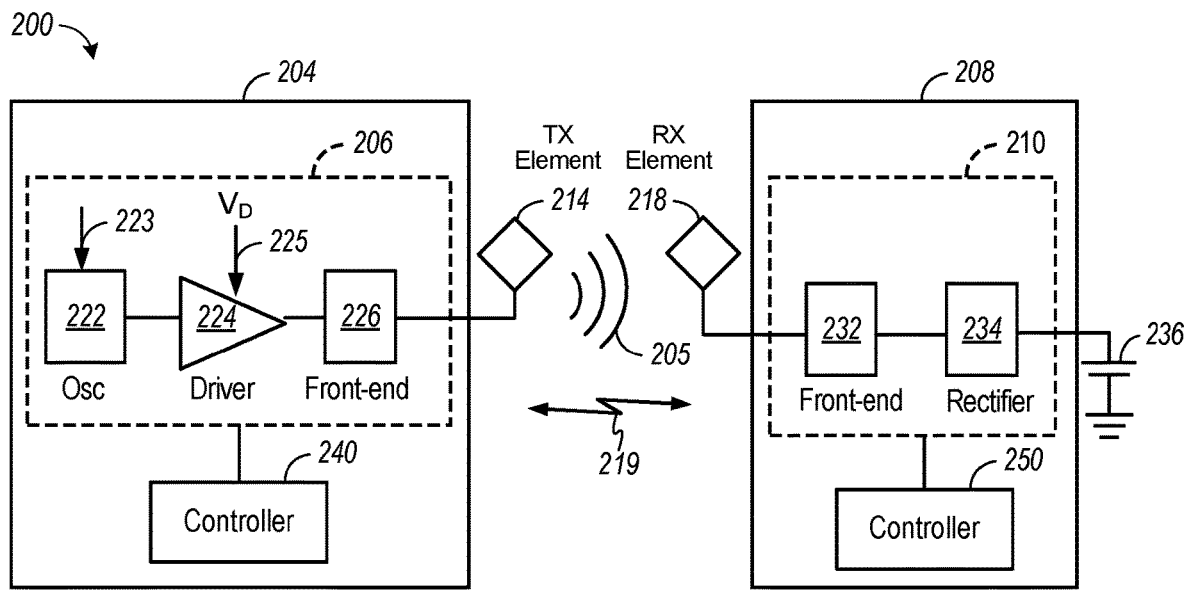
FIG. 2 is a functional block diagram of a wireless power transfer system in accordance with an illustrative embodiment.

FIG. 2 is a functional block diagram of a wireless power transfer system 200, in accordance with another illustrative embodiment. The system 200 may include a transmitter 204 and a receiver 208. The transmitter 204 (also referred to herein as power transfer unit, PTU) may include transmit circuitry 206 that may include an oscillator 222, a driver circuit 224, and a front-end circuit 226. The oscillator 222 may be configured to generate an oscillator signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output a sine wave.

The front-end circuit 226 may include a filter circuit configured to filter out harmonics or other unwanted frequencies. The front-end circuit 226 may include a matching circuit configured to match the impedance of the transmitter 204 to the impedance of the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load.

The transmitter 204 may further include a controller 240 operably coupled to the transmit circuitry 206 and configured to control one or more aspects of the transmit circuitry 206, or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 (also referred to herein as power receiving unit, PRU) may include wireless power receive circuitry 210 that may include a front-end circuit 232 and a rectifier circuit 234. The front-end circuit 232 may include matching circuitry configured to match the impedance of the wireless power receive circuitry 210 to the impedance of the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. In certain embodiments, the transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output of wireless power receive circuitry 210.

The receiver 208 may further include a controller 250 configured similarly to the transmit controller 240 as described above for managing one or more aspects of the wireless power receiver 208. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter 204 and the receiver 208.

Figure 3:
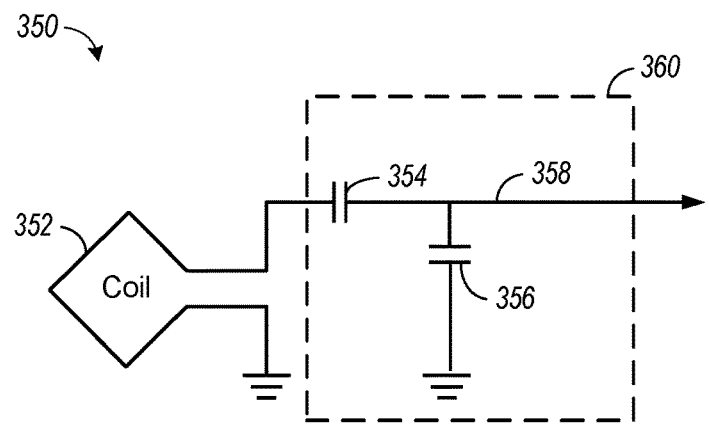
FIG. 3 is a schematic diagram of a portion of wireless power transmit circuitry or wireless power receive circuitry of FIG. 2 including a power transmitting or receiving element in accordance with an illustrative embodiment.

FIG. 3 is a schematic diagram of a portion of the wireless power transmit circuitry 206 or the wireless power receive circuitry 210 of FIG. 2, in accordance with illustrative embodiments. As illustrated in FIG. 3, transmit or receive circuitry 350 may include a power transmitting or receiving element 352 and a tuning circuit 360. The power transmitting or receiving element 352 may also be referred to or be configured as an antenna or a "loop" antenna. The term "antenna" generally refers to a component that may wirelessly output or receive energy for coupling to another antenna. The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil and/or other inductor forming the power transmitting or receiving element 352. Capacitance (e.g., a capacitor) may be provided by the tuning circuit 360 to create a resonant structure at a desired resonant frequency. As a non limiting example, the tuning circuit 360 may comprise a capacitor 354 and a capacitor 356, which may be added to the transmit and/or receive circuitry 350 to create a resonant circuit.

The tuning circuit 360 may include other components to form a resonant circuit with the power transmitting or receiving element 352. As another non-limiting example, the tuning circuit 360 may include a capacitor (not shown) placed in parallel between the two terminals of the circuitry 350. Still other designs are possible. In some embodiments, the tuning circuit in the front-end circuit 226 may have the same design (e.g., 360) as the tuning circuit in front-end circuit 232. In other embodiments, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Although aspects disclosed herein may be generally directed to resonant wireless power transfer, persons of ordinary skill will appreciate that aspects disclosed herein may be used in non-resonant implementations for wireless power transfer.

Figure 4:
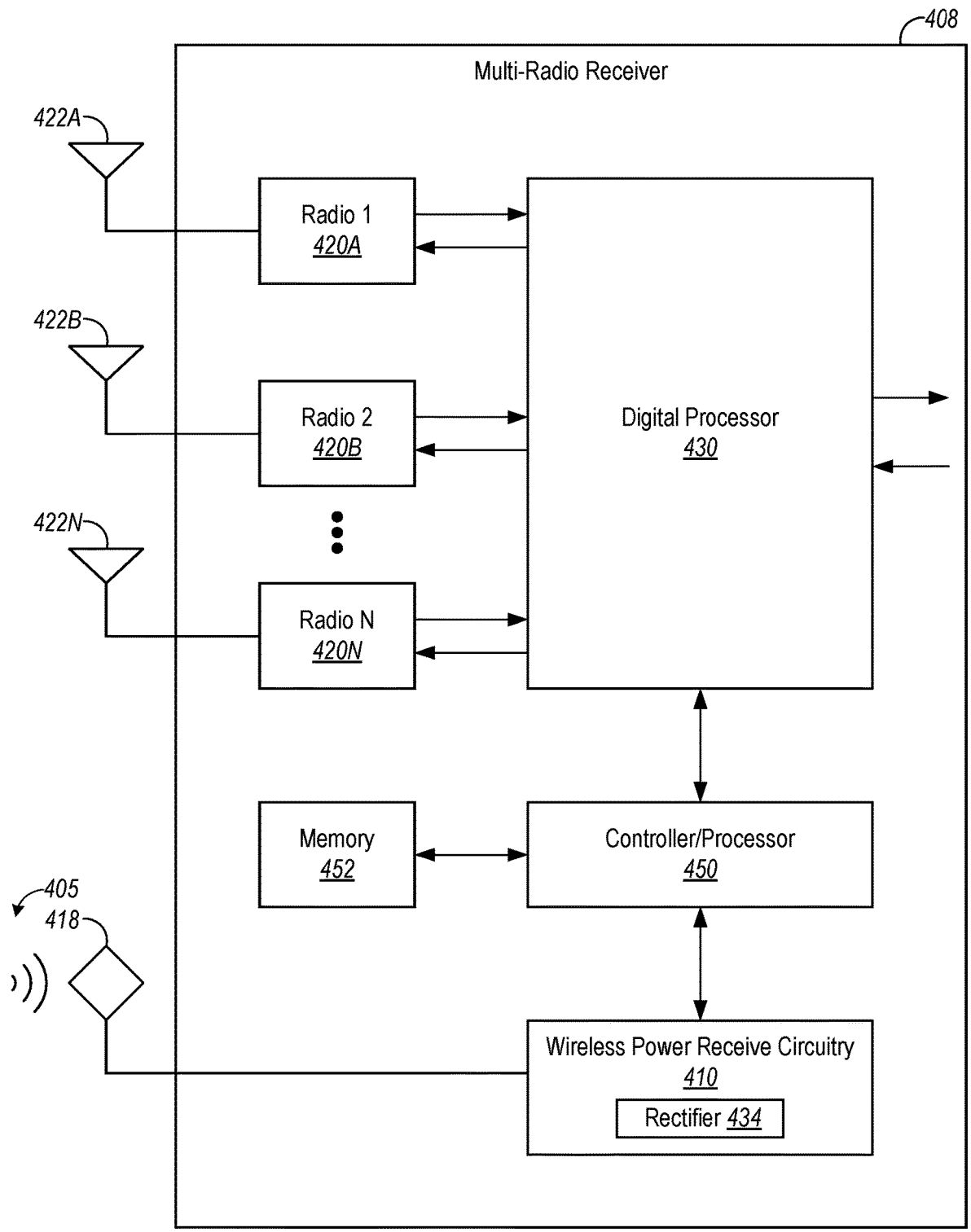
FIG. 4 is a functional block diagram of a receiver, in accordance with another illustrative embodiment.

FIG. 4 is a functional block diagram of a receiver 408, in accordance with another illustrative embodiment. The receiver 408 (also referred to herein as power receiving unit, PRU) may include wireless power receive circuitry 410 which includes a rectifier 434, and operates as described above with reference to wireless power receive circuitry 210. The receiver 408 further includes a power receiving element 418, and operates as described above with reference to power receiving element 218. The receiver 408 may further include N radios 420A through 420N, which can be coupled to N antennas 422A through 422N, respectively, where N can be any integer value. It should be appreciated, however, that respective radios 420 can be coupled to any number of antennas 422 and that multiple radios 420 can also share a given antenna 422.

In general, a radio 420 can be a unit that radiates or emits energy in an electromagnetic spectrum, receives energy in an electromagnetic spectrum, or generates energy that propagates via conductive means. By way of example, a radio 420 can be a unit that transmits a signal to a system or a device or a unit that receives signals from a system or device. Accordingly, it can be appreciated that a radio 420 can be utilized to support wireless communication. In another example, a radio 420 can also be a unit (e.g., a screen on a computer, a circuit board, etc.) that emits noise, which can impact the performance of other radios. Accordingly, it can be further appreciated that a radio 420 can also be a unit that emits noise and interference without supporting wireless communication.

In an aspect, respective radios 420 can support communication with one or more systems. Multiple radios 420 can additionally or alternatively be used for a given system, e.g., to transmit or receive on different frequency bands (e.g., cellular and PCS bands).

In another aspect, a digital processor 430 can be coupled to radios 420A through 420N and can perform various functions, such as processing for data being transmitted or received via the radios 420. The processing for each radio 420 can be dependent on the radio technology supported by that radio and can include encryption, encoding, modulation, etc., for a transmitter; demodulation, decoding, decryption, etc., for a receiver, or the like.

In operation, the wireless power receive circuitry 410 rectifies the magnetic or electromagnetic field 405 received at the receive element 418. During the rectification process, the rectifier 434 may generate harmonics that are then discernable in the magnetic or electromagnetic field 405 and further couple to the transmit element 214, as illustrated in FIG. 2. The transmit element 214 necessarily generates high power electromagnetic fields which include the interfering harmonics from the rectification process. The high power electromagnetic fields are perceived by the radios 420 as interference resulting in desense at the affected radios 420. The frequencies of these interference harmonics occurs at, for example, frequencies that interfere with the operation of one or more radios 420. In an aspect, the transmit element 214 includes one or more bandstop filters (BSF) at one or more frequencies of interest (e.g., frequency response), namely at the interfering harmonic frequencies which correspond to one or more bands of interest to one or more of the radios 420. However, it should be noted that other types of filters may be used, such as e.g., low-pass, high-pass, bandpass, etc., to filter our any number and/or range of frequencies of interest.

Figure 5A:
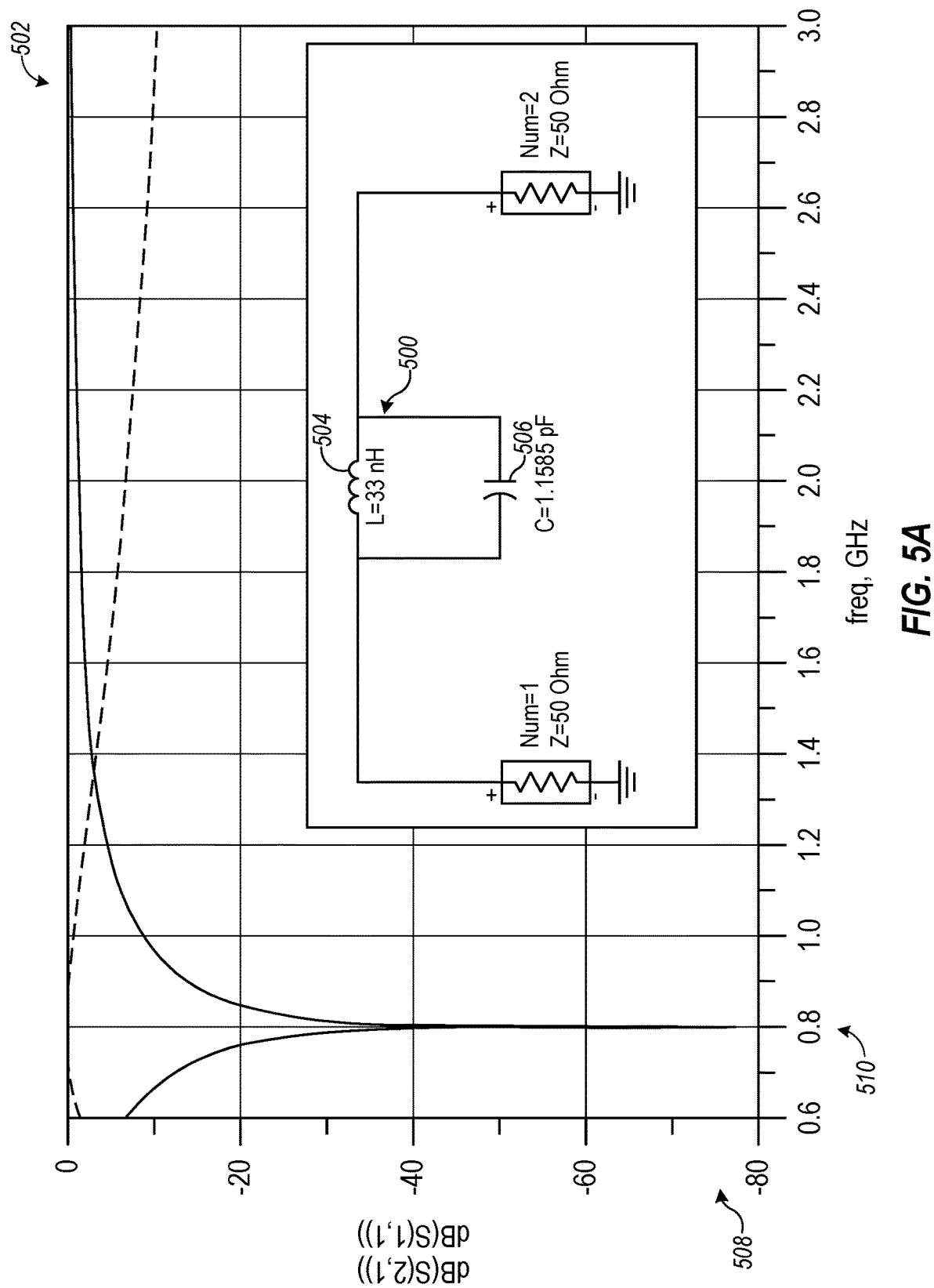
FIG. 5A illustrates a bandstop filter (BSF) and a plot of the frequency response of the bandstop filter, in accordance with an illustrative embodiment.

FIG. 5A illustrates a bandstop filter (BSF) 500 and a plot 502 of the frequency response of the bandstop filter 500. The bandstop filter 500 includes an inductive element (inductor L) 504 in parallel with a capacitive element (capacitor C) 506. The inductive element 504 may be a lumped inductive element, such as a discrete inductor, or a distributed inductive element, such as segments of a conductive path, as disclosed herein. Similarly, capacitive element 506 may be a lumped capacitive element, such as a discrete capacitor, or a distributed capacitive element, such as segments of a conductive path.

In operation, the bandstop filter 500 produces a reduced frequency response 508 at a bandstop frequency 510. By way of example, the illustrated bandstop frequency occurs at 800 MHz which coincides with LTE band 5 which may be an operational frequency of one or more radios 420.

Figure 5B:
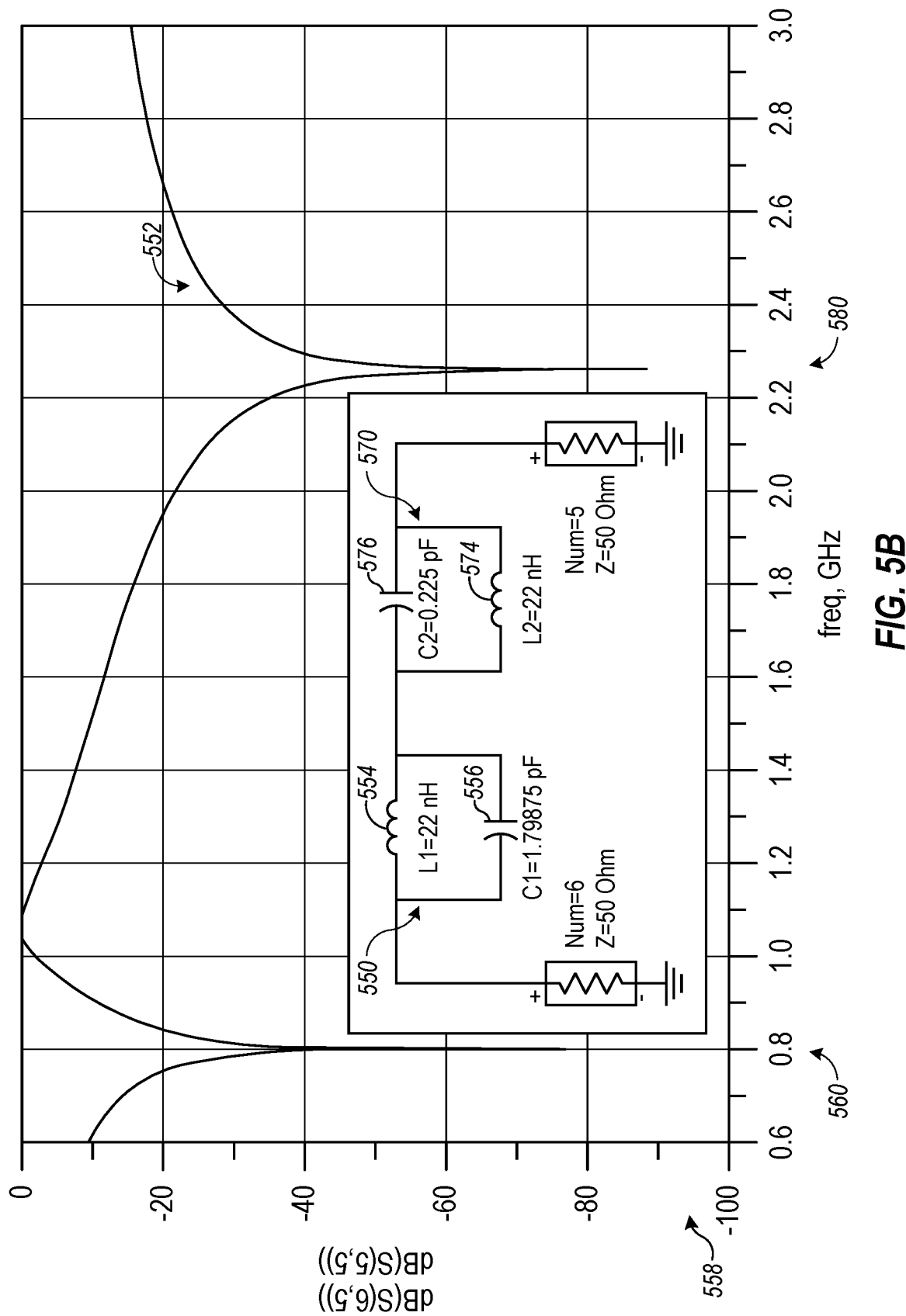
FIG. 5B illustrates a plurality of bandstop filters (BSFs) and a plot of the frequency response of the bandstop filters, in accordance with an illustrative embodiment.

FIG. 5B illustrates a low bandstop filter (BSF) 550 and a high bandstop filter (BSF) 570. A plot 552 illustrates the frequency response of low bandstop filter 550 and high bandstop filter (BSF) 570. The low bandstop filter 550 includes a first inductive element (inductor L1) 554 in parallel with a first capacitive element (capacitor C1) 556. The high bandstop filter 570 includes a second inductive element (inductor L2) 574 in parallel with a second capacitive element (capacitor C2) 576. The inductive elements 554 and 574 may be lumped inductive elements, such as discrete inductors, or distributed inductive elements, such as segments of a conductive path, as disclosed herein. Similarly, the capacitive elements 556 and 576 may be lumped capacitive elements, such as discrete capacitors, or distributed capacitive elements, such as segments of a conductive path.

In operation, the bandstop filters 550 and 570 produce reduced frequency responses 558 at bandstop frequencies 560 and 580. By way of example, the illustrated bandstop frequencies occur around 800 MHz and between 1.7 GHz to 2.4 GHz, which respectively coincides with low band LTE and high band LTE which may be operational frequencies of one or more radios 420.

Figure 6:
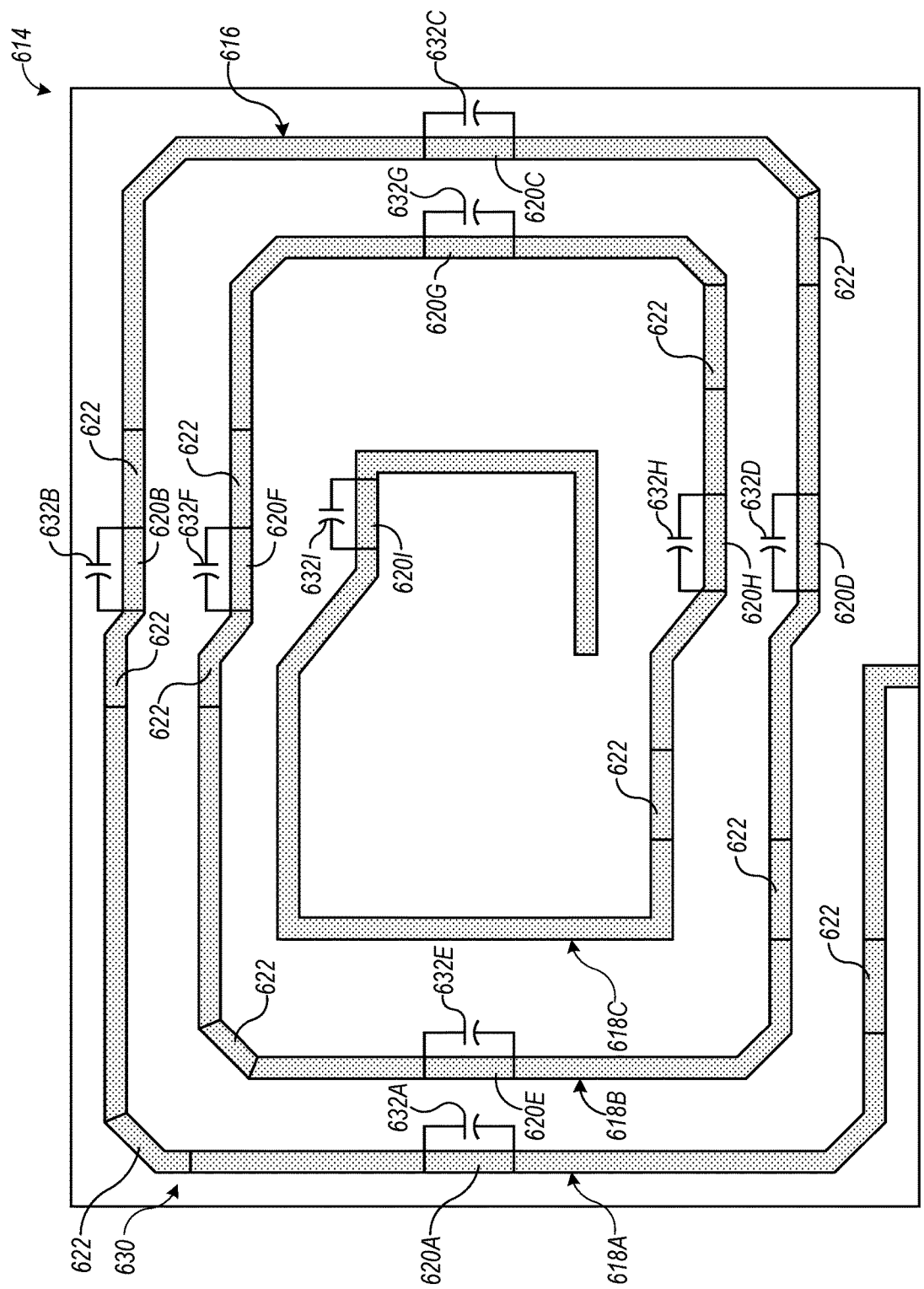
FIG. 6 illustrates a layout of a transmit element, in accordance with an illustrative embodiment.

FIG. 6 illustrates a layout of a transmit element 614, in accordance with an illustrative embodiment. The transmit element 614 includes a substantially planar conductive trace 616 which may be configured as one or more loops 618, an example of which are loops 618A, 618B and 618C. The substantially planar conductive trace 616 includes inductance along the substantial length of the conductive trace. The inductance along the trace 616 may be considered as a "distributed" inductance and may be considered as including a plurality of distributed inductive elements or segments with each inductive element or segment exhibiting a specific quantity of inductance.

The conductive trace 616 may include an infinite number of distributed inductive elements based upon the quantity of inductance used to define a length of each distributed inductive element. As used herein, a distributed inductive element is defined as a length or portion of the conductive trace 616 that provides a desired amount of inductance for forming a filter. By of example, the conductive trace 616 in FIG. 6 illustrates nine identified or selected ones of distributed inductive elements 620A-620I. The distributed inductive elements 620A-620I may together form one or more inductive elements 504, 554 and 574 of FIG. 5A and FIG. 5B. The remainder of the conductive trace 616 may be considered to also include non-selected ones of distributed inductive elements, an example of a few illustrated as non-selected ones of distributed inductive elements 622.

The transmit element 614 further includes at least one bandstop filter 630. The bandstop filter 630 includes distributed inductance and distributed capacitance, in one example, which accumulates along the conductive trace 616. The accumulation results in the desired total inductance and capacitance to perform the desired bandstop filtering of signals transmitted or radiated by the transmit element 614. The distributed capacitance, in the present example of FIG. 6, is comprised of one or more discrete capacitors 632A-632I coupled in parallel with the selected ones of the distributed inductive elements 620A-620I.

In accumulation, the selected ones of the distributed inductive elements 620A-620I in parallel with a respective plurality of discrete capacitors 632A-632I form the corresponding inductance and capacitance to form the bandstop filter 630. In one exemplary embodiment, each of the selected ones of the distributed inductive elements may be spaced along the trace at selected intervals corresponding to a wavelength, or fraction thereof, of the bandstop frequency. For example, distributed inductive element 620A is spaced from distributed inductive element 602B by a distance equal to one-quarter of the wavelength of the bandstop frequency.

Figure 7:
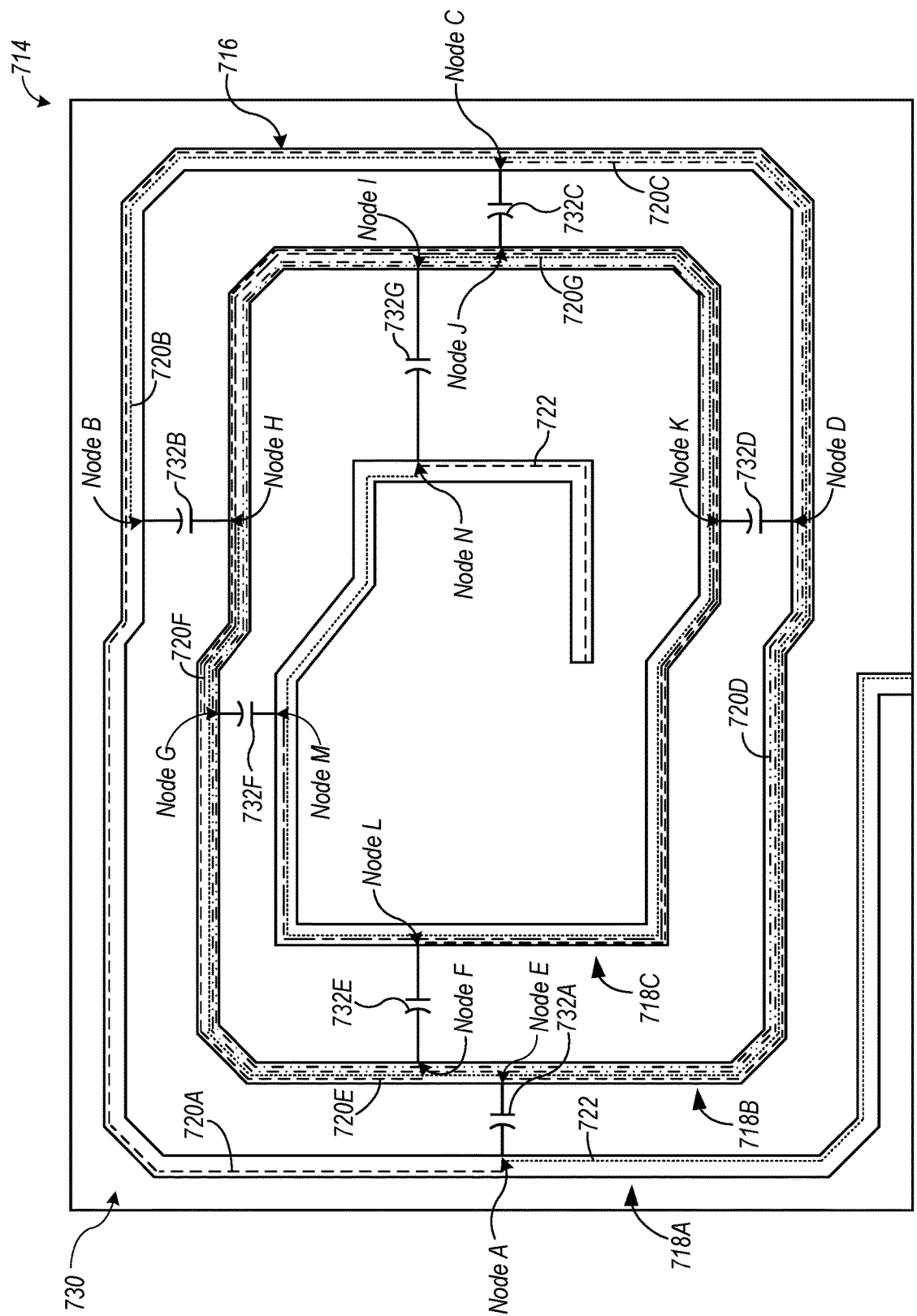
FIG. 7 illustrates a layout of a transmit element, in accordance with an illustrative embodiment.

FIG. 7 illustrates a layout of a transmit element 714, in accordance with an illustrative embodiment. The transmit element 714 includes a substantially planar conductive trace 716 which may be configured as one or more loops 718, an example of which are loops 718A, 718B and 718C. The substantially planar conductive trace 716 includes inductance along the substantial length of the conductive trace. As stated, the inductance along the trace 716 may be considered as a "distributed" inductance and may be considered as including a plurality of distributed inductive elements or segments with each inductive element or segment exhibiting a specific quantity of inductance.

The conductive trace 716 may include an infinite number of distributed inductive elements based upon the quantity of inductance used to define a length of each distributed inductive element. As used herein, a distributed inductive element is defined as a length or portion of the conductive trace 716 that provides a desired amount of inductance for forming a filter. By of example, the conductive trace 716 in FIG. 7 illustrates seven identified or selected ones of distributed inductive elements 720A-720G. The dashed or dotted lines in FIG. 7 within and generally following the path of the conductive trace 716 are provided for reference, to distinguish the extent of each of the distributed inductive elements 720A-720G from the extents of the others, and do not represent any structural feature. The distributed inductive elements 720A-720G may together form one or more inductive elements 504, 554 and 574 of FIG. 5A and FIG. 5B. The distributed inductive elements include essentially an entire loop 718 of the conductive trace 716. Specifically, distributed inductive element 720A includes the portion of conductive trace 716 between Node A and Node E, distributed inductive element 720B includes the portion of conductive trace 716 between Node B and Node H, distributed inductive element 720C includes the portion of conductive trace 716 between Node C and Node J, distributed inductive element 720D includes the portion of conductive trace 716 between Node D and Node K, distributed inductive element 720E includes the portion of conductive trace 716 between Node F and Node L, distributed inductive element 720F includes the portion of conductive trace 716 between Node G and Node M, and distributed inductive element 720G includes the portion of conductive trace between Node I and Node N. The remainder of the conductive trace 716 may be considered to also include non-selected ones of distributed inductive elements, an example of a few illustrated as non-selected ones of distributed inductive elements 722.

The transmit element 714 further includes at least one bandstop filter 730. The bandstop filter 730 includes distributed inductance and distributed capacitance, in one example, which accumulates along the conductive trace 716. The accumulation results in the desired total inductance and capacitance to perform the desired bandstop filtering of signals transmitted or radiated by the transmit element 714. The distributed capacitance, in the present example of FIG. 7, is comprised of one or more discrete capacitors 732A-732G coupled in parallel with the selected ones of the distributed inductive elements 720A-720G.

In accumulation, the selected ones of the distributed inductive elements 720A-720G in parallel with a respective plurality of discrete capacitors 732A-732G form the corresponding inductance and capacitance to form the bandstop filter 730. In one exemplary embodiment, each of the selected ones of the distributed inductive elements may be spaced along the trace at selected intervals corresponding to a wavelength, or fraction thereof, of the bandstop frequency. For example, distributed inductive element 720A is spaced from distributed inductive element 720B by a distance equal to one-quarter of the wavelength of the bandstop frequency.

Figure 8:
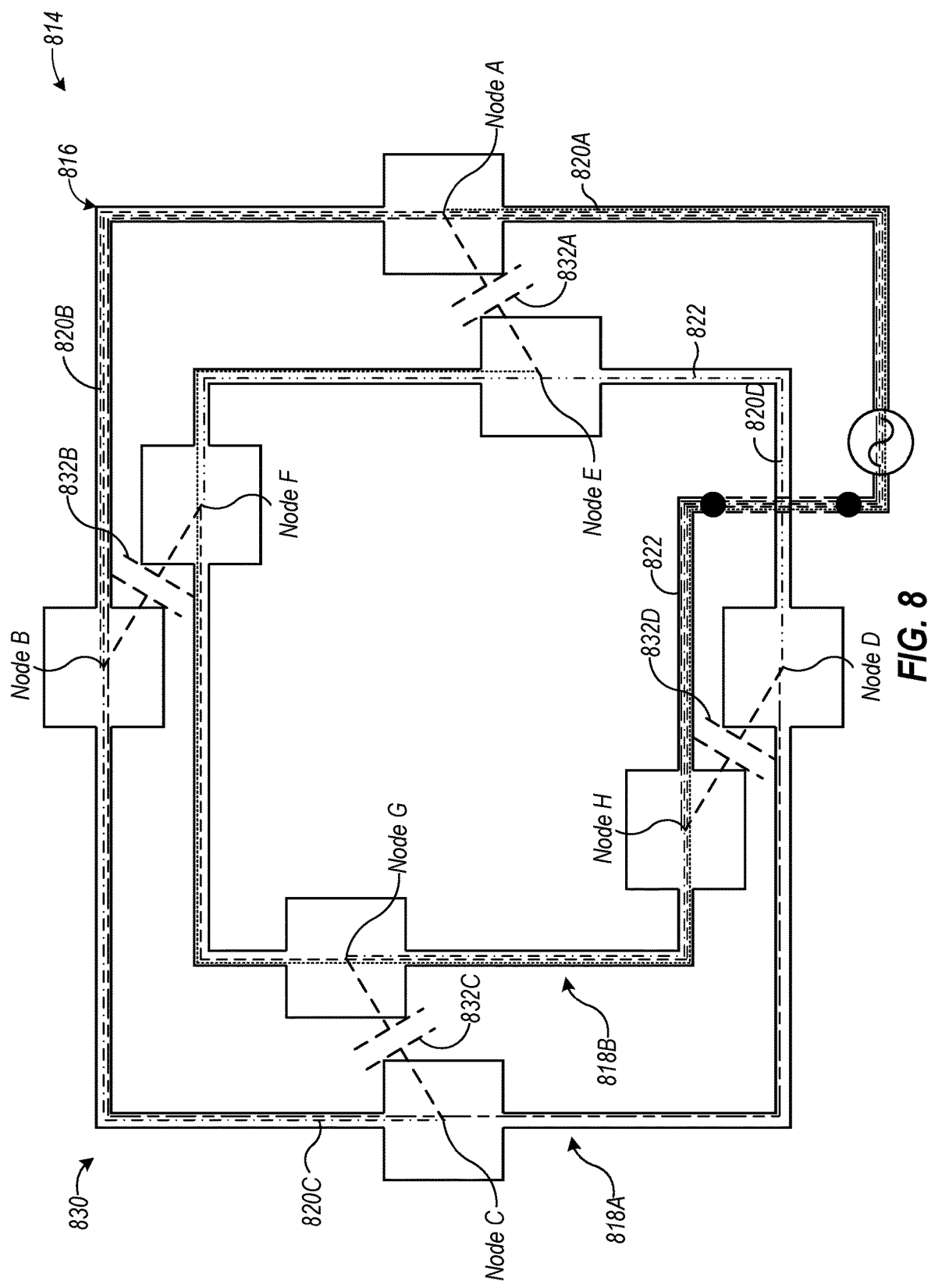
FIG. 8 illustrates a layout of a transmit element, in accordance with an illustrative embodiment.

FIG. 8 illustrates a layout of a transmit element 814, in accordance with an illustrative embodiment. In the present embodiment, capacitors 832A-832D are formed on the same plane as the distributed inductive elements 820A-820D and, in one example, are formed from the same circuit board material as conductive trace 816. Accordingly, no discrete inductive or capacitive components are used to create a bandstop filter 830 in the present embodiment.

The transmit element 814 includes a substantially planar conductive trace 816 which may be configured as one or more loops 818, an example of which are loops 818A and 818B. The substantially planar conductive trace 816 includes inductance along the substantial length of the conductive trace. As stated, the inductance along the trace 816 may be considered as a "distributed" inductance and may be considered as including a plurality of distributed inductive elements or segments with each inductive element or segment exhibiting a specific quantity of inductance.

The conductive trace 816 may include an infinite number of distributed inductive elements based upon the quantity of inductance used to define a length of each distributed inductive element. As used herein, a distributed inductive element is defined as a length or portion of the conductive trace 816 that provides a desired amount of inductance for forming a filter. By of example, the conductive trace 816 in FIG. 8 illustrates four identified or selected ones of distributed inductive elements 820A-820D. The dashed or dotted lines in FIG. 8 within and generally following the path of the conductive trace 816 are provided for reference, to distinguish the extent of each of the distributed inductive elements 820A-820D from the extents of the others, and do not represent any structural feature. The distributed inductive elements include essentially an entire loop 818 of the conductive trace 816. Specifically, distributed inductive element 820A includes the portion of conductive trace 816 between Node A and Node E, distributed inductive element 820B includes the portion of conductive trace 816 between Node B and Node F, distributed inductive element 820C includes the portion of conductive trace 816 between Node C and Node G, and distributed inductive element 820D includes the portion of conductive trace 816 between Node D and Node H. The remainder of the conductive trace 816 may be considered to also include non-selected ones of distributed inductive elements, an example of a few illustrated as non-selected ones of distributed inductive elements 822.

The transmit element 814 further includes at least one bandstop filter 830. The bandstop filter 830 includes distributed inductance and distributed capacitance, in one example, which accumulates along the conductive trace 816. The accumulation results in the desired total inductance and capacitance to perform the desired bandstop filtering of signals transmitted or radiated by the transmit element 814. The distributed capacitance, in the present example of FIG. 8, is comprised of one or more capacitors 832A-832D coupled in parallel with the selected ones of the distributed inductive elements 820A-820D.

In accumulation, the selected ones of the distributed inductive elements 820A-820D in parallel with a respective plurality of capacitors 832A-832D form the corresponding inductance and capacitance to form the bandstop filter 830. In one exemplary embodiment, each of the selected ones of the distributed inductive elements may be spaced along the trace at selected intervals corresponding to a wavelength, or fraction thereof, of the bandstop frequency. For example, distributed inductive element 820A is spaced from distributed inductive element 820B by a distance equal to one-quarter of the wavelength of the bandstop frequency.

Figure 9:
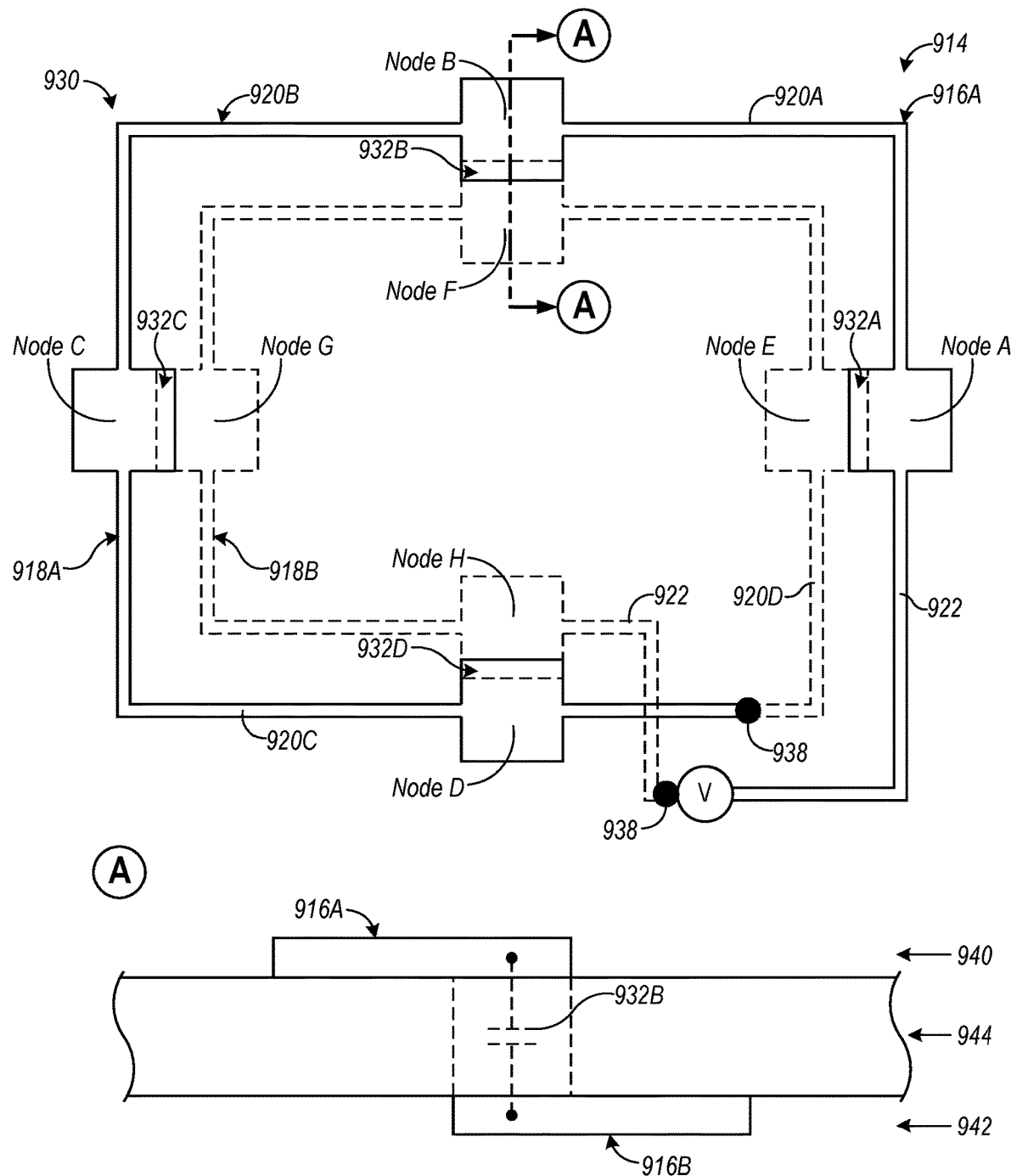
FIG. 9 illustrates a layout of a transmit element, in accordance with an illustrative embodiment.

FIG. 9 illustrates a layout of a transmit element 914, in accordance with an illustrative embodiment. In the present embodiment, some of capacitors 932A-932D are formed on different planes as are the distributed inductive elements 920A-920D and, in one example, are formed from the same circuit board material as conductive traces 916A and 916B. Accordingly, no discrete inductive or capacitive components are used to create a bandstop filter 930 in the present embodiment.

The transmit element 914 includes a substantially planar conductive trace 916A on a first side 940 coupled using vias 938 to a substantially planar conductive trace 916B on a second side 942 of a circuit board 944. The conductive trace 916 which may be configured as one or more loops 918, an example of which are loops 918A and 918B. The substantially planar conductive trace 916 includes inductance along the substantial length of the conductive trace. As stated, the inductance along the trace 916 may be considered as a "distributed" inductance and may be considered as including a plurality of distributed inductive elements or segments with each inductive element or segment exhibiting a specific quantity of inductance.

The conductive trace 916 may include an infinite number of distributed inductive elements based upon the quantity of inductance used to define a length of each distributed inductive element. As used herein, a distributed inductive element is defined as a length or portion of the conductive trace 916 that provides a desired amount of inductance for forming a filter. By way of example, the conductive trace 916 in FIG. 9 illustrates four identified or selected ones of distributed inductive elements 920A-920D. The distributed inductive elements include essentially an entire loop 918 of the conductive trace 916. Specifically, distributed inductive element 920A includes the portion of conductive trace between Node A and Node E, distributed inductive element 920B includes the portion of conductive trace between Node B and Node F, distributed inductive element 920C includes the portion of conductive trace between Node C and Node G, and distributed inductive element 920D includes the portion of conductive trace between Node D and Node H. The remainder of the conductive trace 916 may be considered to also include non-selected ones of distributed inductive elements, an example of a few illustrated as non-selected ones of distributed inductive elements 922.

The transmit element 914 further includes at least one bandstop filter 930. The bandstop filter 930 includes distributed inductance and distributed capacitance, in one example, which accumulates along the conductive trace 916. The accumulation results in the desired total inductance and capacitance to perform the desired bandstop filtering of signals transmitted or radiated by the transmit element 914. The distributed capacitance, in the present example of FIG. 9, is comprised of one or more capacitors 932A-932D coupled in parallel with the selected ones of the distributed inductive elements 920A-920D.

In accumulation, the selected ones of the distributed inductive elements 920A-920D in parallel with a respective plurality of capacitors 932A-932D form the corresponding inductance and capacitance to form the bandstop filter 930. In one exemplary embodiment, each of the selected ones of the distributed inductive elements may be spaced along the trace at selected intervals corresponding to a wavelength, or fraction thereof, of the bandstop frequency. For example, distributed inductive element 920A is spaced from distributed inductive element 902B by a distance equal to one-quarter of the wavelength of the bandstop frequency.

Figure 10:
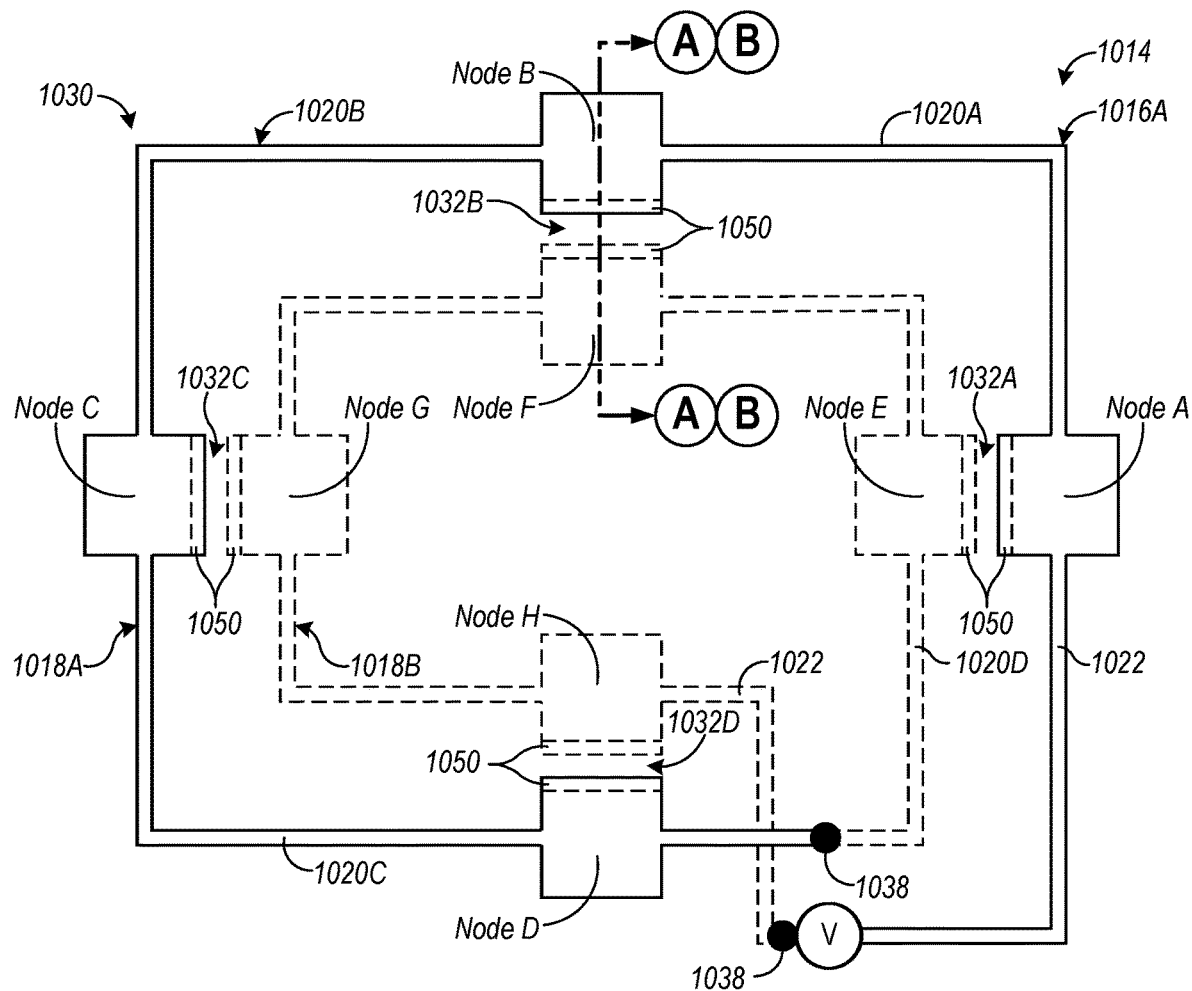
FIG. 10 illustrates a layout of a transmit element, in accordance with an illustrative embodiment.
Figure 10:
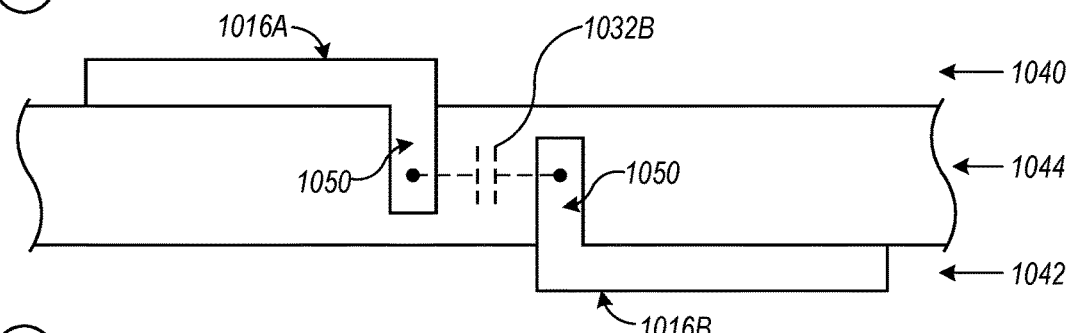
Figure 10:
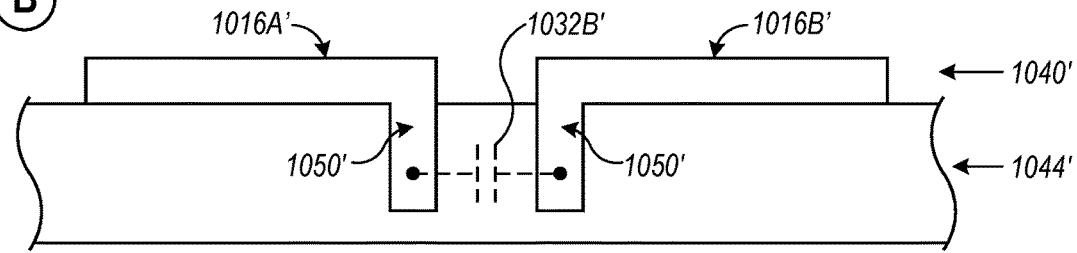

FIG. 10 illustrates a layout of a transmit element 1014, in accordance with an illustrative embodiment. In the present embodiment, some of capacitors 1032A-1032D are formed on different planes as are the distributed inductive elements 1020A-1020D and, in one example, are formed from partial vias 1050 extending from conductive traces 1016A and 1016B. Accordingly, no discrete inductive or capacitive components are used to create a bandstop filter 1030 in the present embodiment.

The transmit element 1014 includes a substantially planar conductive trace 1016A on a first side 1040 coupled using vias 1038 to a substantially planar conductive trace 1016B on a second side 1042 of a circuit board 1044. The conductive trace 1016 which may be configured as one or more loops 1018, an example of which are loops 1018A and 1018B. The substantially planar conductive trace 1016 includes inductance along the substantial length of the conductive trace. As stated, the inductance along the trace 1016 may be considered as a "distributed" inductance and may be considered as including a plurality of distributed inductive elements or segments with each inductive element or segment exhibiting a specific quantity of inductance.

The conductive trace 1016 may include an infinite number of distributed inductive elements based upon the quantity of inductance used to define a length of each distributed inductive element. As used herein, a distributed inductive element is defined as a length or portion of the conductive trace 1016 that provides a desired amount of inductance for forming a filter. By way of example, the conductive trace 1016 in FIG. 10 illustrates four identified or selected ones of distributed inductive elements 1020A-1020D. The distributed inductive elements include essentially an entire loop 1018 of the conductive trace 1016. Specifically, distributed inductive element 1020A includes the portion of conductive trace between Node A and Node E, distributed inductive element 1020B includes the portion of conductive trace between Node B and Node F, distributed inductive element 1020C includes the portion of conductive trace between Node C and Node G, and distributed inductive element 1020D includes the portion of conductive trace between Node D and Node H. The remainder of the conductive trace 1016 may be considered to also include non-selected ones of distributed inductive elements, an example of a few illustrated as non-selected ones of distributed inductive elements 1022.

The transmit element 1014 further includes at least one bandstop filter 1030. The bandstop filter 1030 includes distributed inductance and distributed capacitance, in one example, which accumulates along the conductive trace 1016. The accumulation results in the desired total inductance and capacitance to perform the desired bandstop filtering of signals transmitted or radiated by the transmit element 1014. The distributed capacitance, in the present example of FIG. 10, is comprised of one or more capacitors 1032A-1032D coupled in parallel with the selected ones of the distributed inductive elements 1020A-1020D.

In accumulation, the selected ones of the distributed inductive elements 1020A-1020D in parallel with a respective plurality of capacitors 1032A-1032D form the corresponding inductance and capacitance to form the bandstop filter 1030. In one exemplary embodiment, each of the selected ones of the distributed inductive elements may be spaced along the trace at selected intervals corresponding to a wavelength, or fraction thereof, of the bandstop frequency. For example, distributed inductive element 1020A is spaced from distributed inductive element 1002B by a distance equal to one-quarter of the wavelength of the bandstop frequency.

FIG. 10 further illustrates a cross-section B, in accordance with an alternate embodiment. Both loops 1018A and 1018B in cross-section B are formed on the same first side 1040' with capacitors 1032 formed along conductive traces 1016A' and 1016B' using partial vias 1050'. An example of the resulting capacitor 1032 is illustrated as capacitor 1032B'.

Figure 11:
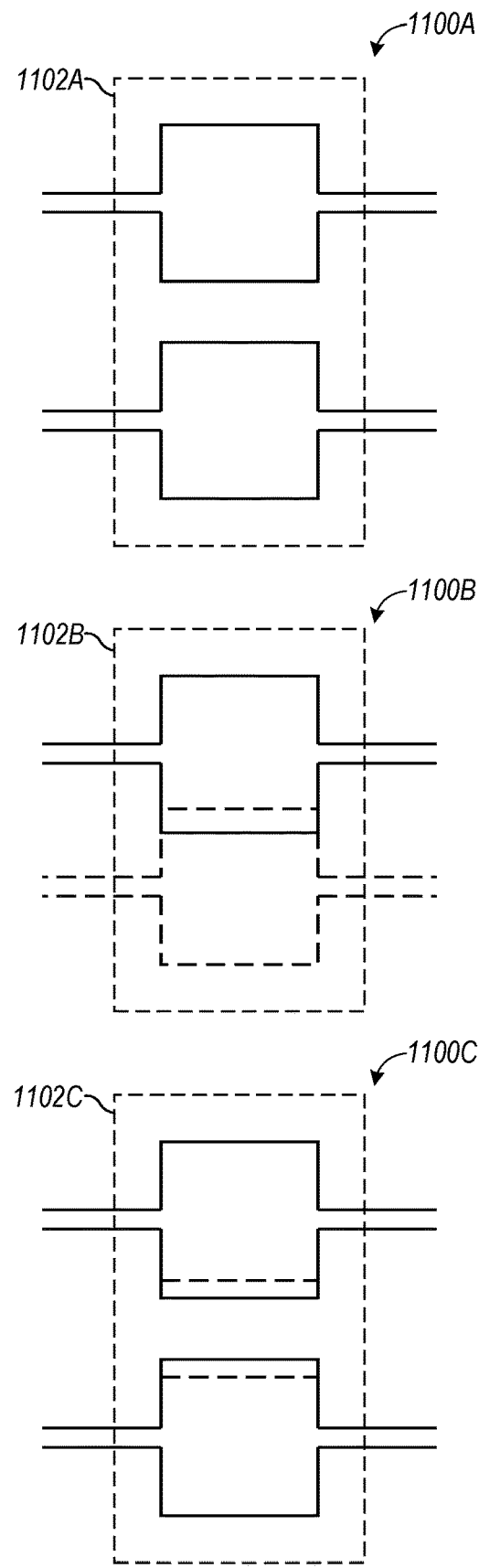
FIG. 11 illustrates shielding for elements of the bandstop filter, in accordance with an embodiment.

FIG. 11 illustrates shielding for elements of the bandstop filter, in accordance with an embodiment. As described above, portions of the conductive trace may be used to form reactive elements 1100 such as inductive elements, capacitive elements, or both for a transmit element. The transmit element may be configured as a transmit antenna for wireless charging. When a receive element, such as an electronic device capable of wireless charging is placed in close proximity to the transmit element, the inductive or capacitive elements may experience a shift in reactance values due to the metallic composition of the electronic device to be charged. In one illustrative embodiment, a ferrite layer 1102 may be formed over the reactive elements 1100 to shield the reactive elements 1100 from shifting in values when an electronic device is placed in proximity to the transmit element. The ferrite layer 1102 may be formed or otherwise deposited on the side of the reactive elements 1100 nearest to the location of placement of the electronic device.

Figure 12:
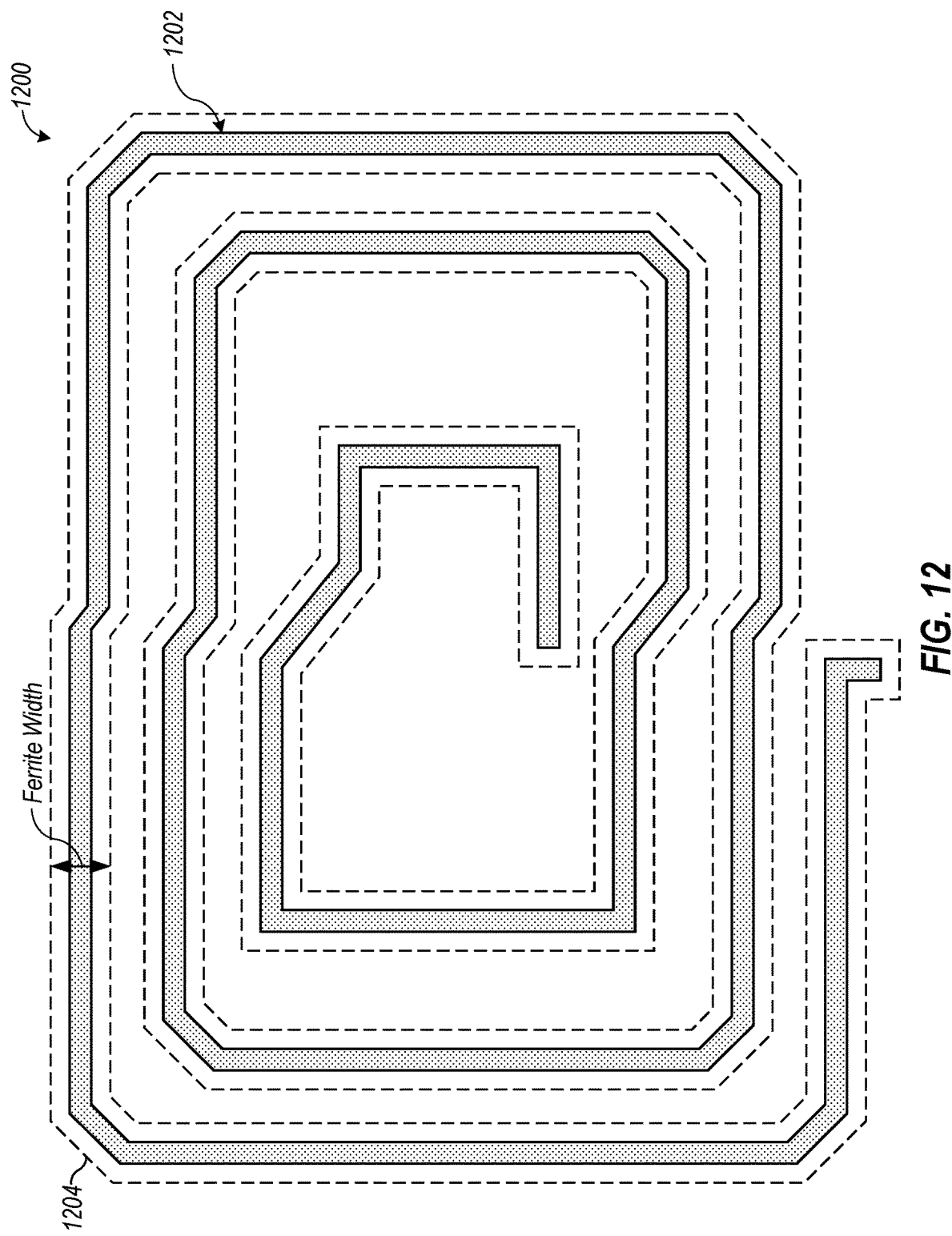
FIG. 12 illustrates shielding for elements of the bandstop filter, in accordance with another embodiment.

FIG. 12 illustrates shielding for elements of the bandstop filter, in accordance with another embodiment. As described above, a transmit element 1200 may be formed from portions of a conductive trace 1202 which may include reactive elements formed along the conductive trace 1202. The transmit element 1200 may be configured as a transmit antenna for wireless charging. When a receive element, such as an electronic device capable of wireless charging is placed in close proximity to the transmit element 1200, the inductive or capacitive elements may experience a shift in reactance values due to the metallic composition of the electronic device to be charged. In one illustrative embodiment, a ferrite layer 1204 may be formed over the conductive trace 1202 to shield the reactive elements from shifting in values when an electronic device is placed in proximity to the transmit element 1200. The ferrite layer 1204 may be formed or otherwise deposited on the side of the reactive elements nearest to the location of placement of the electronic device.

Figure 13:
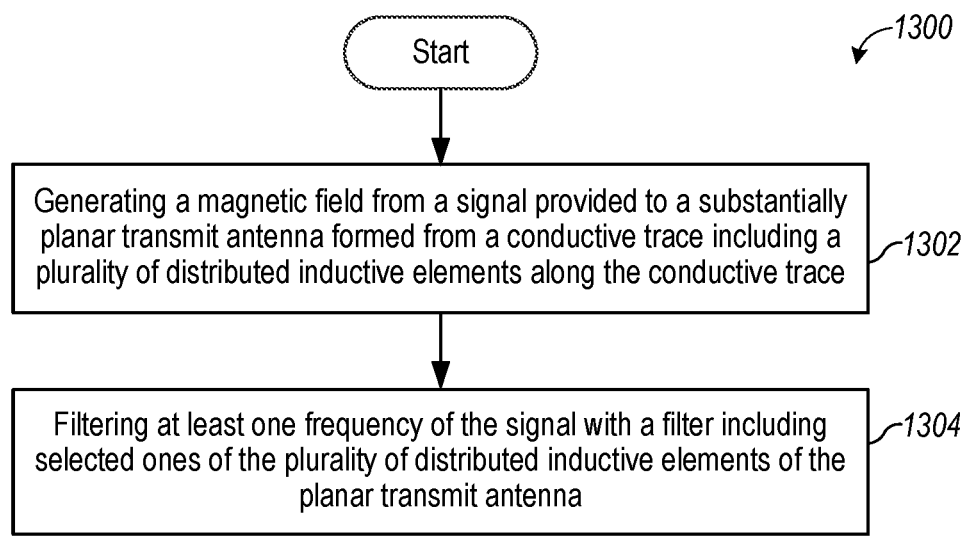
FIG. 13 is a flowchart illustrating a method 1300, in accordance with one or more exemplary embodiments.

FIG. 13 is a flowchart illustrating a method 1300, in accordance with one or more exemplary embodiments. Method 1300 for wireless power transfer may include generating a magnetic field from a signal provided to a substantially planar transmit antenna formed from a conductive trace including a plurality of distributed inductive elements along the conductive trace (depicted by numeral 1302). Method 1300 may also include filtering at least one frequency of the signal with a bandstop filter including selected ones of the plurality of distributed inductive elements of the planar transmit antenna (depicted by numeral 1304). In one implementation, the filtered frequency comprises a bandstop frequency.

Figure 14:
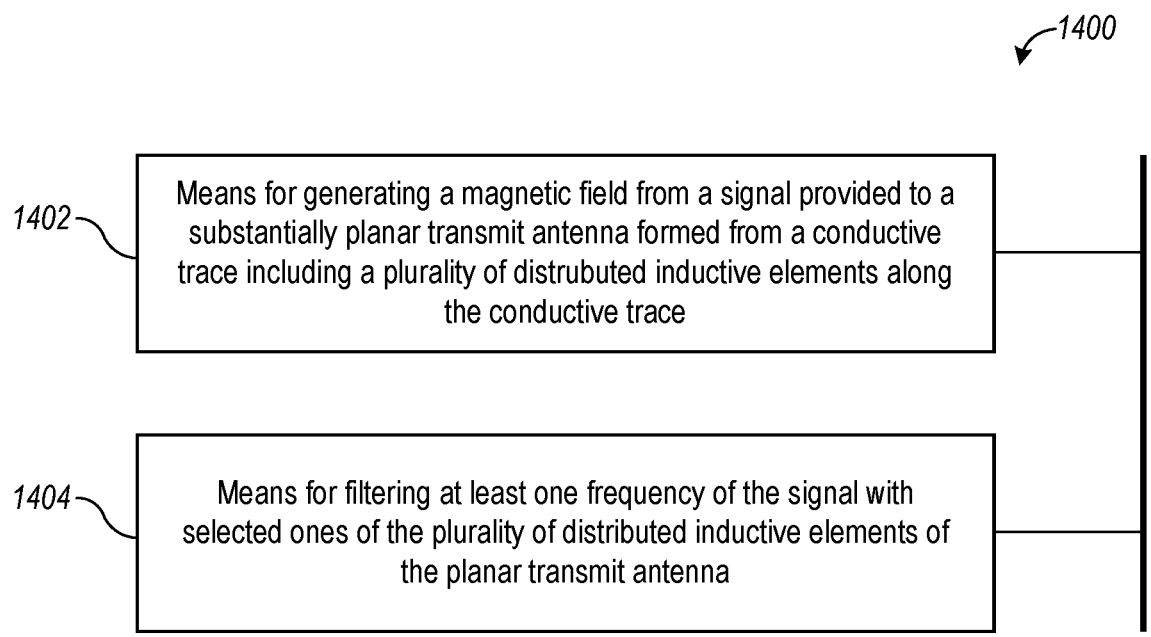
FIG. 14 shows a functional block diagram of a wireless power transmit device, in accordance with an illustrative embodiment.

FIG. 14 shows an exemplary embodiment of a wireless power transmit device 1400. For example, a transmit element is suitable for use in wireless power transfer systems 100 and 200. In an aspect, device 1400 is implemented by one or more modules configured to provide the functions as described herein. For example, in an aspect, each module comprises hardware and/or hardware executing software.

A wireless power transmit device 1400 comprises a means (1402) for generating a magnetic field from a signal provided to a substantially planar transmit antenna formed from a conductive trace including a plurality of distributed inductive elements along the conductive trace.

Device 1400 also comprises means (1404) for filtering at least one frequency of the signal with a bandstop filter including selected ones of the plurality of distributed inductive elements of the planar transmit antenna.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the present disclosure. Thus, the present disclosure is not intended to be limited to the exemplary embodiments shown herein but is to be accorded the widest scope consistent with the principles and novel features disclosed herein.

What is claimed is:

1. A wireless power transmit element, comprising:
   a substantially planar transmit antenna configured to generate a magnetic field and formed from a conductive trace including a plurality of distributed inductive elements along the conductive trace, wherein the conductive trace includes a plurality of loops; and
   a plurality of discrete capacitors coupled with first selected ones of the plurality of distributed inductive elements to form a first filter configured to generate a first frequency response.

2. The wireless power transmit element of claim 1, further comprising a second bandstop filter formed from second selected ones of the plurality of distributed inductive elements of the planar transmit antenna and configured to generate a second frequency response.

3. The wireless power transmit element of claim 1, wherein the first filter comprises a first bandstop filter configured to generate the first frequency response comprising a first bandstop frequency response.

4. The wireless power transmit element of claim 3, wherein the first bandstop frequency response of the first bandstop filter is based on one or more operating frequencies of a receiver in a receive device.

5. The wireless power transmit element of claim 1, wherein each of the plurality of discrete capacitors couples in parallel with each of the first selected ones of the plurality of distributed inductive elements.

6. The wireless power transmit element of claim 1, further comprising a ferrite layer placed over the first selected ones of the distributed inductive elements.

7. The wireless power transmit element of claim 1, further comprising a ferrite layer placed over and along the conductive trace.

8. A method for wireless power transfer, comprising:
generating a magnetic field from a signal provided to a substantially planar transmit antenna formed from a conductive trace including a plurality of distributed inductive elements along the conductive trace, wherein the conductive trace includes a plurality of loops; and
filtering a first frequency of the signal with a first filter including first selected ones of the plurality of distributed inductive elements of the planar transmit antenna and a plurality of discrete capacitors coupled with the first selected ones of the plurality of distributed inductive elements.

9. The method of claim 8, further comprising filtering a second frequency of the signal with a second filter including second selected ones of the plurality of distributed inductive elements of the planar transmit antenna.

10. The method of claim 9, wherein the first frequency comprises a first bandstop frequency; and
wherein the first filter comprises a first bandstop filter.

11. The method of claim 10, wherein the first bandstop frequency of the first bandstop filter is based on one or more operating frequencies of a receiver in a receive device.

12. The method of claim 8, wherein each of the plurality of discrete capacitors couples in parallel with each of the first selected ones of the plurality of distributed inductive elements.

13. The method of claim 8, the planar transmit antenna further including a ferrite layer placed over the first selected ones of the distributed inductive elements.

14. The method of claim 8, the planar transmit antenna further including a ferrite layer placed over and along the conductive trace.

15. A wireless power transmit device, comprising:
means for generating a magnetic field from a signal provided to a substantially planar transmit antenna formed from a conductive trace including a plurality of distributed inductive elements along the conductive trace, wherein the conductive trace includes a plurality of loops; and
means for filtering a first frequency of the signal with a first selected ones of the plurality of distributed inductive elements of the planar transmit antenna and a plurality of discrete capacitors coupled with the first selected ones of the plurality of distributed inductive elements.

16. The wireless power transmit device of claim 15, further comprising a means for filtering a second frequency of the signal with a second selected ones of the plurality of distributed inductive elements of the planar transmit antenna.

17. The wireless power transmit device of claim 15, wherein the means for filtering the first frequency comprises a first bandstop filter, the first frequency comprising a bandstop frequency.

* * * * *